United States Patent
Ogikubo et al.

(10) Patent No.: US 7,626,752 B2
(45) Date of Patent: Dec. 1, 2009

(54) MICROELECTROMECHANICAL DEVICE ARRAY APPARATUS AND METHOD FOR DRIVING SAME

(75) Inventors: Shinya Ogikubo, Kanagawa (JP); Hirochika Nakamura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 404 days.

(21) Appl. No.: 11/453,863

(22) Filed: Jun. 16, 2006

(65) Prior Publication Data

US 2007/0002426 A1  Jan. 4, 2007

(30) Foreign Application Priority Data

Jun. 16, 2005  (JP)  ............................ P2005-176578

(51) Int. Cl.
*G02B 26/00* (2006.01)

(52) U.S. Cl. ...................................... 359/291; 359/290

(58) Field of Classification Search ................. 359/223, 359/224, 290, 291, 238
See application file for complete search history.

(56) References Cited

U.S. PATENT DOCUMENTS 7,095,545 B2 * 8/2006 Regan ......................... 359/290
7,221,498 B2 * 5/2007 Richards et al. ............. 359/291

FOREIGN PATENT DOCUMENTS

JP  10-48543 A  2/1998

* cited by examiner

*Primary Examiner*—Timothy J Thompson
(74) *Attorney, Agent, or Firm*—Sughrue Mion, PLLC

(57) ABSTRACT

A microelectromechanical device array apparatus is provided and includes: an device array one-dimensionally or two-dimensionally arranged with devices including a movable portion having movable electrodes and fixed electrodes facing to the movable portion for displacing the movable portion to one of two different positions; and a drive circuit for inclining the movable portion by writing an device-displacing signal to the fixed electrodes and applying a control voltage to the movable electrodes when the device in a first state of controlling to displace the position of the movable portion from one to the other of the two different positions and the device in a second state of controlling to maintain the position of the movable portion at one position of the two different positions, there is brought about a state in which the device in the first state crosses over pull-out and the device in the second state does not cross over the pull-out.

22 Claims, 11 Drawing Sheets

MICROELECTROMECHANICAL DEVICE ARRAY APPARATUS AND METHOD FOR DRIVING SAME

FIELD OF THE INVENTION

The invention relates to a microelectromechanical device array apparatus preferable for promoting reliability of operation of a microelectromechanical device array by achieving a reduction in a load of a drive circuit for driving a microelectromechanical device array and its driving method.

BACKGROUND OF THE INVENTION

JP-A-10-48543 shown below describes a method of driving a microelectromechanical device array of DMD (digital micromirror device) or the like in a background art. The drive method of the background art will be explained in reference to FIGS. 9 to 11.

FIG. 9 is a constitution view of two devices of a microelectromechanical device array. A semiconductor board 1 is formed with a drive circuit, not illustrated, at inside thereof, and a surface portion of the semiconductor board 1 is formed with movable mirrors 2, 3.

The respective movable mirrors 2, 3 each is supported above a hollow space by a hinge 6 hung between supports 4, 5 respectively erected on the surface of the semiconductor board 1 and is made to be pivotable in a left and right direction centering on the hinge 6. The hinge 6 is integrally formed with electrode films 7, 8 in the left and right direction by interposing the hinge 6, and the surface of the semiconductor board 1 is formed with fixed electrode films 9, 10 at positions of being opposed to the electrode films 7, 8.

When a bias voltage Vb=24 V is applied to the hinge 6 (electrode films 7, 8) of the movable mirror 2 as a control voltage, an address voltage Va=5 is applied to the fixed electrode film 9, and an address voltage Va=0 is applied to the fixed electrode film 10 respectively as device-displacing signals, a voltage difference DV between the electrode films 7, 9 becomes DV=19 V, a voltage difference DV between the electrode films 8, 9 becomes DV=24 V, and by a difference between an electrostatic force between the electrode films 7, 9 and an electrostatic force between the electrode films 8, 10, the movable mirror 2 is inclined in a direction of bringing the electrode films 8, 10 into contact with each other. An illustrated state shows a state of inclining the movable mirror 2 by −10°.

Similarly, when the bias voltage Vb=24 V is applied to the hinge 6 (electrode films 7, 8) of the movable mirror 3, an address voltage Va=9 is applied to the fixed electrode film 9, and an address voltage Va is applied to the fixed electrode film 10, a voltage difference DV between the electrode films 7, 9 becomes DV=24 V, a voltage difference DV between the electrode films 8, 10 becomes DV=19 V, and by a difference between an electrostatic force between the electrode films 7, 9 and an electrostatic force between the electrode films 8, 10, the movable mirror 3 is inclined in a direction of bringing the electrode films 7, 9 into contact with each other. An illustrated state shows a state of inclining the movable mirror 3 by plus 10°.

When incident light is irradiated to the movable mirrors 2, 3, directions of reflected light differ in accordance with inclinations of the movable mirrors 2, 3, and by controlling the inclinations of the movable mirrors 2, 3, directions of reflected light can be controlled to ON/OFF.

However, it is difficult to operate a plurality of mirrors in the same direction or in an inverse direction independently from one another and simultaneously with one another and therefore, in the background art, the movable mirrors are controlled to be driven by carrying out a complicated voltage control. The control will be explained in reference to FIGS. 10 and 11.

The inclined movable mirror 2 is shown at a topmost stage of FIG. 10. When the movable mirror 2 inclined to a left side is changed to a following state, there are two ways of "following state". That is, there are a case of inclining the movable mirror 2 to an opposed side (right side) and a case of inclining the movable mirror 2 to the same side (left side) (case of maintaining an inclined state). To which state the movable mirror 2 is changed depends on image data to be formed when the microelectromechanical device array is used as an image forming apparatus.

A drawing on a left side surrounded by a frame at a lower stage of FIG. 10 shows a case of displacing the movable mirror 2 to an opposed side (Crossover transition) and a drawing on a right side shows a case of maintaining an inclined state of the movable mirror 2 as it is (Stay transition). An address voltage Va applied to the fixed electrode films 9, 10 of the respective movable mirrors 2, 3 is controlled respectively for the movable mirrors 2, 3, and a bias voltage Vb is commonly applied to all of the movable mirrors.

When the state of inclining the movable mirror is made to transit to a following state, the bias voltage Vb is changed as shown by FIG. 1. When a time period from starting to change to finish to change the movable mirror is divided to zones A, B, C, D, E, first, at zone A, the bias voltage is set to Vb=24 V, at zone B, set to Vb=−26 V. At next zone C, the bias voltage is set to Vb=7.5 V, at zone D, the bias voltage is returned to Vb=24 V, and at zone E, the bias voltage is maintained at Vb=24 V.

At zone A, the address voltage Va is applied (or rewritten) to 0 V or 5 V. In changing the movable mirror to a following state, when the movable mirror is intended to be inclined by making the electrode films 7, 8 moved integrally with the movable mirror proximate to the fixed electrode film 9, the voltage Va applied to the fixed electrode film 9 is set to 0 V, and when the movable mirror is intended to be inclined by making the electrode films 7, 8 proximate to the fixed electrode film 10, the voltage Va applied to the fixed electrode film 10 is set to 0 V and the voltage Va applied to the opposed side electrode film is set to 5 V. Therefore, the address voltage Va is also referred to as an device-displacing voltage (or an device-displacing signal).

When the applied voltage is controlled in this way, as shown by a left side (crossover side) of FIG. 10, at zone B, the bias voltage becomes Vb=−26 V, the voltage difference DV between the electrode films 8, 10 becomes DV=33.5 V and the voltage difference DV becomes DV=26 V between the electrode films 7, 9. Thereby, the movable mirror 2 is applied with an electrostatic force of further inclining the movable mirror 2 to the left side, and the electrode film 8 is further pressed to the fixed electrode film 10 in a state of being brought into contact with the fixed electrode film 10 to be elastically deformed. Further, although the state is described as "contact" for convenience of explanation, actually, a gap is maintained between the two electrode films, and the electrode films are not electrically shortcircuited.

At next zone C, when the bias voltage becomes Vb=7.5 V, the voltage applied to the fixed electrode film 10 is set to Va=7.5 V. Thereby, the voltage difference between the electrode films 8, 10 becomes DV=0 and the voltage difference between the electrode films 7, 9 becomes DV=7.5 V. Thereby, an electrostatic force is generated between the electrode films 7, 9, a repulsive force by elastically deforming the electrode film 8 at zone B is added to the electrostatic force to detach the electrode film 8 from the electrode film 10, and the movable mirror 2 starts rotating in the clockwise direction.

At next zone D, when the bias voltage becomes Vb=24 V, the difference between the electrode films 8, 10 becomes DV=16.5 V, the voltage difference between the electrode films 7, 9 becomes DV=24 V, the electrostatic force operated between the electrode films 7, 9 is further intensified, and the movable mirror 2 is rotated further in the clockwise direction.

At final zone E, the electrode film 7 of the movable mirror 2 is impacted to the address electrode film 9. At this occasion, the voltage applied to the address electrode film 10 is set to Va=5 V. The movable mirror 2 is slightly vibrated as shown by FIG. 11 by the impact and thereafter brought into a stable state to finish the operation of inclining to the opposed side.

In order to bring the movable mirror 2 in a state on a right side (stay side) of FIG. 10, as shown by an upper stage on a right side in a frame of FIG. 10, the voltage applied to the fixed electrode film 10 is set to Va=0 (zone A). At next zone B, when the bias voltage becomes Vb=−26 V, the voltage applied to the fixed electrode film 9 on the opposed side is set to Vb=7.5 V and at next zone C, the bias voltage becomes Vb=7.5 V.

At this occasion, as shown by a dotted line circle H in FIG. 11, the electrode film 8 is temporarily detached from the electrode film 10, at zone D, when the bias voltage becomes Vb=24 V, the electrode film 8 is brought into contact with the electrode film 10 again, thereafter, at zone E, the voltage applied to the electrode film 9 is set to Va=5 V, and a state of inclining the movable mirror 2 is maintained to a state of being inclined to a left side.

According to the above-described method of driving the microelectromechanical device array of the background art, at zone C, when the movable mirror of the crossover side device (device for changing from left inclination to right inclination or changing from right inclination to left inclination) is inclined to the opposed side, at zone B, the electrode film 8 is temporarily pressed to the side of the fixed electrode film 10 and the electrode film 8 is detached from the fixed electrode film 10 by also utilizing the repulsive force. At this occasion, also according to the movable mirror on the stay side, at zone C, the electrode film 8 is temporarily detached from the fixed electrode film 10, the above-described repulsive force is not utilized.

That is, according to the driving method of the background art, by a difference in a speed of detaching the electrode film 8 from the fixed electrode film 10 (whether the repulsive force is utilized), the movable mirrors on the crossover side and on the stay side are separated. Therefore, there is brought about an erroneously operated movable mirror unless the difference in the detaching speed can accurately be controlled. Further, the bias voltage Vb is changed from +24 V to −26 V and therefore, a burden applied on the drive circuit is considerable.

SUMMARY OF THE INVENTION

An object of an illustrative, non-limiting embodiment of the invention is to provide a microelectromechanical device array apparatus and its driving method capable of reducing a burden on a drive circuit and easily carrying out an array control.

A microelectromechanical device array apparatus according to an exemplary embodiment of the invention includes: a device array including a plurality of devices one-dimensionally or two-dimensionally arranged, each of the plurality of devices including: a movable portion elastically deformably supported and having a movable electrode; and a plurality of fixed electrodes facing to the movable portion; a plurality of drive circuits corresponding to the plurality of devices, each of the drive circuits applying a device-displacing voltage to one of the movable electrode and the plurality of fixed electrodes and applying a control voltage to the other of the movable electrode and the plurality of fixed electrodes so that an electrostatic force between the movable electrode and each of the plurality of fixed electrodes is generated to displace the movable portion toward one of at least two positions including a first position and a second position different from the first position; and a control section that controls a displacement of the movable position in each of the plurality of the devices. The plurality of devices includes: a first device in a first state to be controlled to displace a position of the movable portion from one of the first and second positions to the other of the first and second positions, and a second device in a second state to be controlled to maintain a position of the movable portion at one of the first and second positions. The control section controls simultaneously the first and second devices so that the position of the movable portion in the first device is displaced while the position of the movable portion in the second device is unmovably maintained.

The control section applies can apply a device-displacing voltage to the first device so that a voltage between the movable electrode and one of the plurality of fixed electrodes provided on a side of moving the movable portion into a voltage having a magnitude upon which the movable portion can be displaced, and can apply a device-displacing voltage to the second device so that a voltage between the movable electrode and one of the plurality of fixed electrodes provided on a side of moving the movable portion into a voltage having a magnitude upon which the movable portion can not be displaced.

The control section can reduce an absolute value of the control voltage applied to the first device so that a voltage between the movable electrode and one of the plurality of fixed electrodes provided on a side of moving the movable portion into a voltage having a magnitude upon which the movable portion can be displaced, and can reduce an absolute value of the control voltage applied to the second device so that a voltage between the movable electrode and one of the plurality of fixed electrodes provided on a side of moving the movable portion into a voltage having a magnitude upon which the movable portion can not be displaced.

Each of the plurality of drive circuits may include a deforming section that elastically deforms at least a portion of the movable portion in the first device at a current position before reducing the absolute value of the control voltage, so as to accelerate the displacement of the movable position by a repulsive force upon the elastically deforming.

The deforming section can convert the control voltage into an inverse polarity.

The absolute value of the control voltage may be reduced after applying the device-displacing voltage to one of the movable electrode and the plurality of fixed electrodes.

The device-displacing voltage may be applied to one of the movable electrode and the plurality of fixed electrodes after reducing the absolute value of the control voltage applied to the other of the movable electrode and the fixed electrodes, The control section may reduce or increase the device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced, and may reduce or increase the device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

The control section can provide each of the plurality of drive circuits with an instruction signal in relation to the device-displacing voltage and the control voltage so as to make the device array an optical modulation.

According to an exemplary embodiment of the invention, a method of driving a microelectromechanical device array apparatus is provided. The microelectromechanical device array apparatus includes: a device array including a plurality of devices one-dimensionally or two-dimensionally arranged, each of the plurality of devices including: a movable portion elastically deformably supported and having a movable electrode; and a plurality of fixed electrodes facing to the movable portion; and a plurality of drive circuits corresponding to the plurality of devices, each of the drive circuits applying a device-displacing voltage to one of the movable electrode and the plurality of fixed electrodes and applying a control voltage to the other of the movable electrode and the plurality of fixed electrodes so that an electrostatic force between the movable electrode and each of the plurality of fixed electrodes is generated to displace the movable portion toward one of at least two positions including a first position and a second position different from the first position. The plurality of devices includes: a first device in a first state to be controlled to displace a position of the movable portion from one of the first and second positions to the other of the first and second positions; and a second device in a second state to be controlled to maintain a position of the movable portion at one of the first and second positions. The method of driving the microelectromechanical device array includes controlling simultaneously the first and second devices so that the position of the movable portion in the first device is displaced while the position of the movable portion in the second device is unmovably maintained.

The method may include: applying a device-displacing voltage to the first device so that a voltage between the movable electrode and one of the plurality of fixed electrodes provided on a side of moving the movable portion into a voltage having a magnitude upon which the movable portion can be displaced; and applying a device-displacing voltage to the second device so that a voltage between the movable electrode and one of the plurality of fixed electrodes provided on a side of moving the movable portion into a voltage having a magnitude upon which the movable portion can not be displaced.

The method may include: reducing an absolute value of the control voltage applied to the first device so that a voltage between the movable electrode and one of the plurality of fixed electrodes provided on a side of moving the movable portion into a voltage having a magnitude upon which the movable portion can be displaced; and reducing an absolute value of the control voltage applied to the second device so that a voltage between the movable electrode and one of the plurality of fixed electrodes provided on a side of moving the movable portion into a voltage having a magnitude upon which the movable portion can not be displaced.

The method may include elastically deforming at least a portion of the movable portion in the first device at a current position before the reducing of the absolute value of the control voltage, so as to accelerate the displacement of the movable position by a repulsive force upon the elastically deforming.

The elastically deforming may be performed by converting the control voltage into an inverse polarity.

In the method, the reducing of the absolute value of the control voltage may be performed after applying the device-displacing voltage to one of the movable electrode and the plurality of fixed electrodes.

The method may include applying a device-displacing voltage to one of the movable electrode and the plurality of fixed electrodes after the reducing of the absolute value of the control voltage applied to the other of the movable electrode and the fixed electrodes.

The method may include: reducing or increasing a device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced; and reducing or increasing a device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

The method may include providing each of the plurality of drive circuits with an instruction signal in relation to the device-displacing voltage and the control voltage so as to make the device array an optical modulation.

An image forming apparatus according to an exemplary embodiment of the invention includes: a light source, a microelectromechanical device array apparatus as above described; an optical system for irradiating the microelectromechanical device array apparatus with light from the light source; and a projecting optical system that projects light emitted from the optical system to an image forming surface.

An exemplary embodiment of the invention can be provided a microelectromechanical device array apparatus and its driving method as well as an image forming apparatus capable of reducing a burden on the drive circuit and easily carrying out the array control.

DETAILED DESCRIPTION OF THE INVENTION

Exemplary embodiments of the invention will be explained in reference to the drawings as follows.

Figure 1:
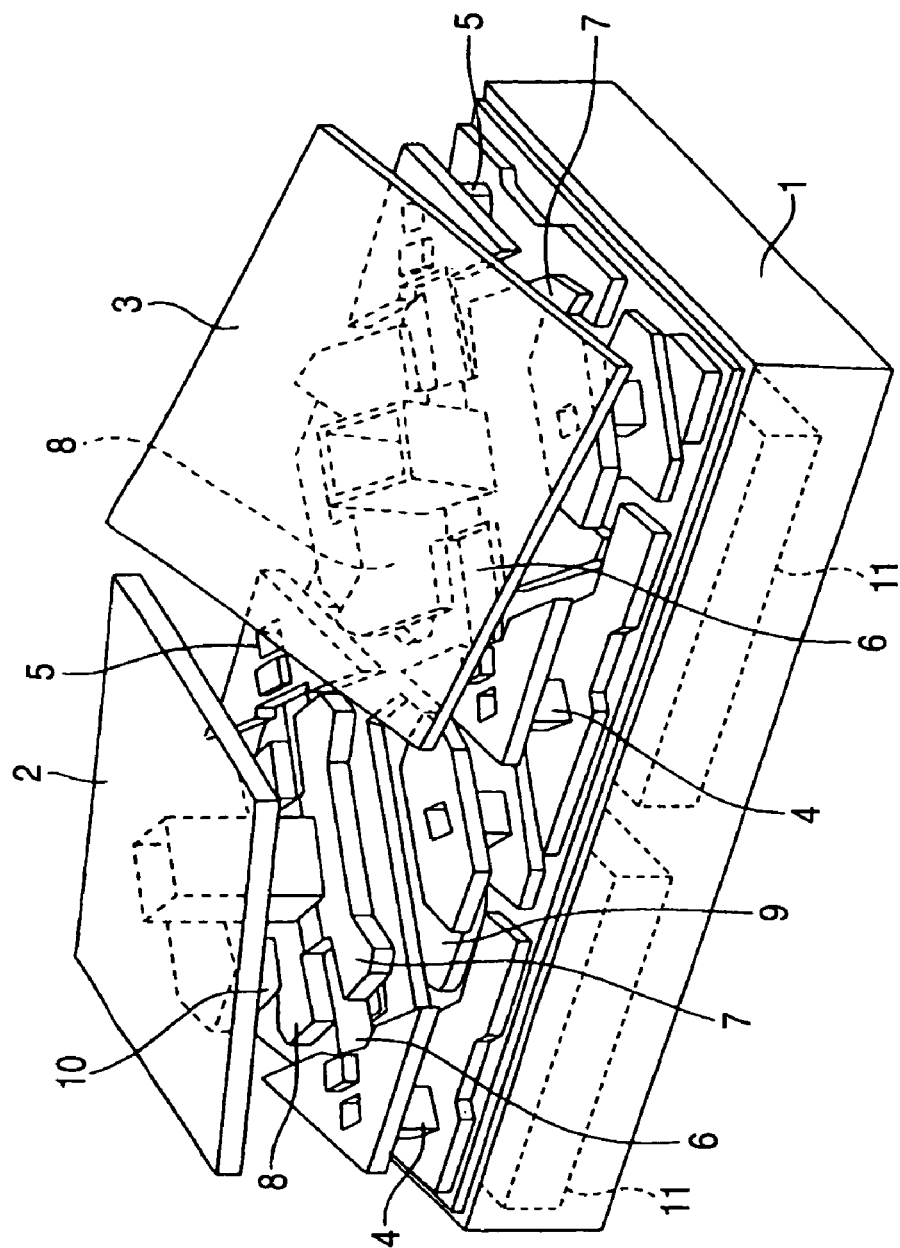
FIG. 1 is a constitution view of two devices in a microelectromechanical device array apparatus according to an exemplary embodiment of the invention.

FIG. 1 is a constitution view of two devices in a microelectromechanical device array according to an embodiment of the invention. Each of the two devices includes a semiconductor board 1 with a drive circuit 11 at inside thereof, and movable mirrors 2, 3 above a surface portion of the semiconductor board 1. The respective movable mirrors 2, 3 each is supported above a hollow space by a hinge 6 hung between supports 4, 5 respectively erected on the surface of the semiconductor board 1 and is made to be pivotable in a left and right direction centering on the hinge 6. The hinge 6 is integrally formed with electrode films 7, 8 in the left and right direction by interposing the hinge 6, and fixed electrode films 9, 10 at positions of being opposed to the electrode films 7, 8 are formed above the surface of the semiconductor board 1.

First Embodiment

Figure 2:
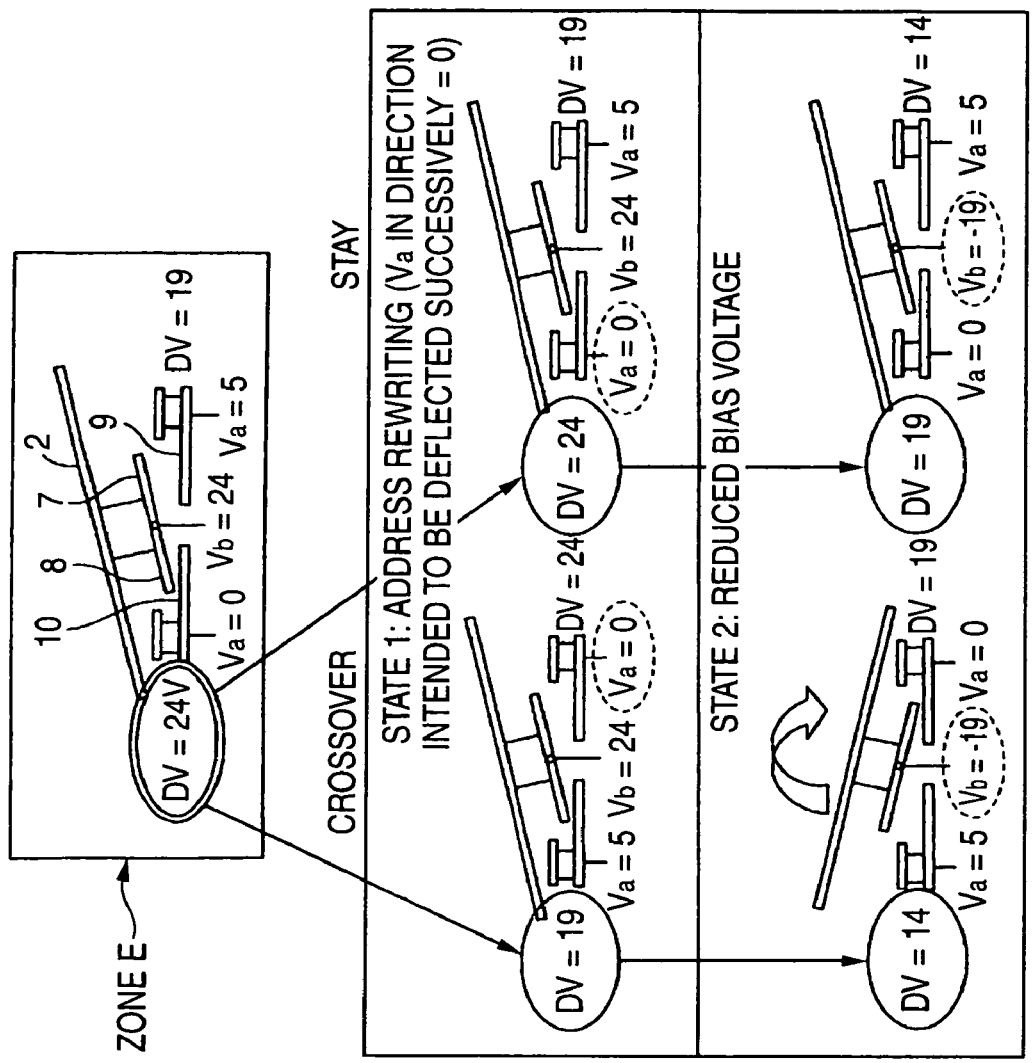
FIG. 2 is an explanatory view of a method of driving a microelectromechanical device array apparatus according to a first exemplary embodiment of the invention.
Figure 3:
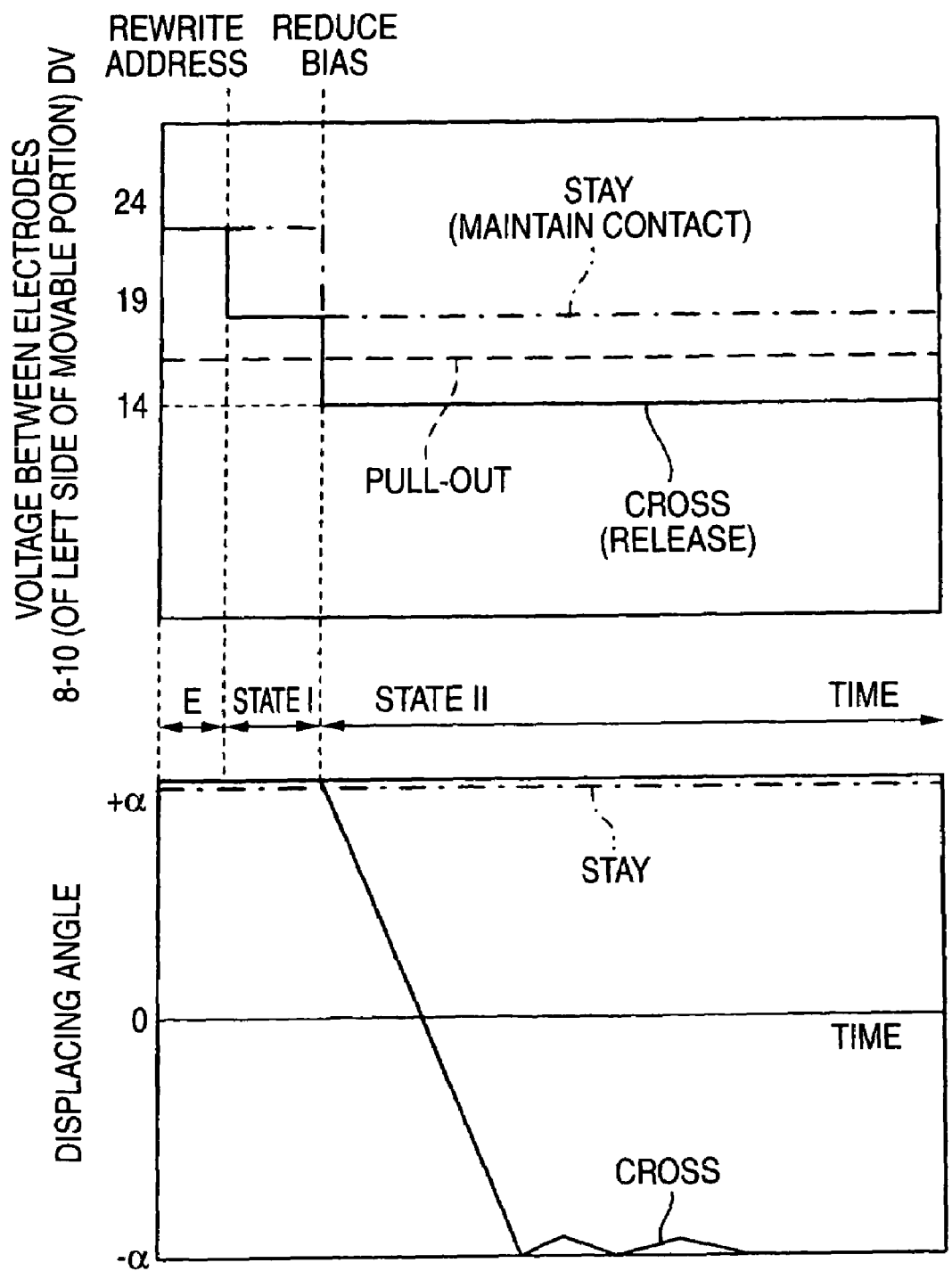
FIG. 3 is a graph showing a voltage between electrodes and an angle of displacing a movable mirror of the driving method shown in FIG. 2.
Figure 9:
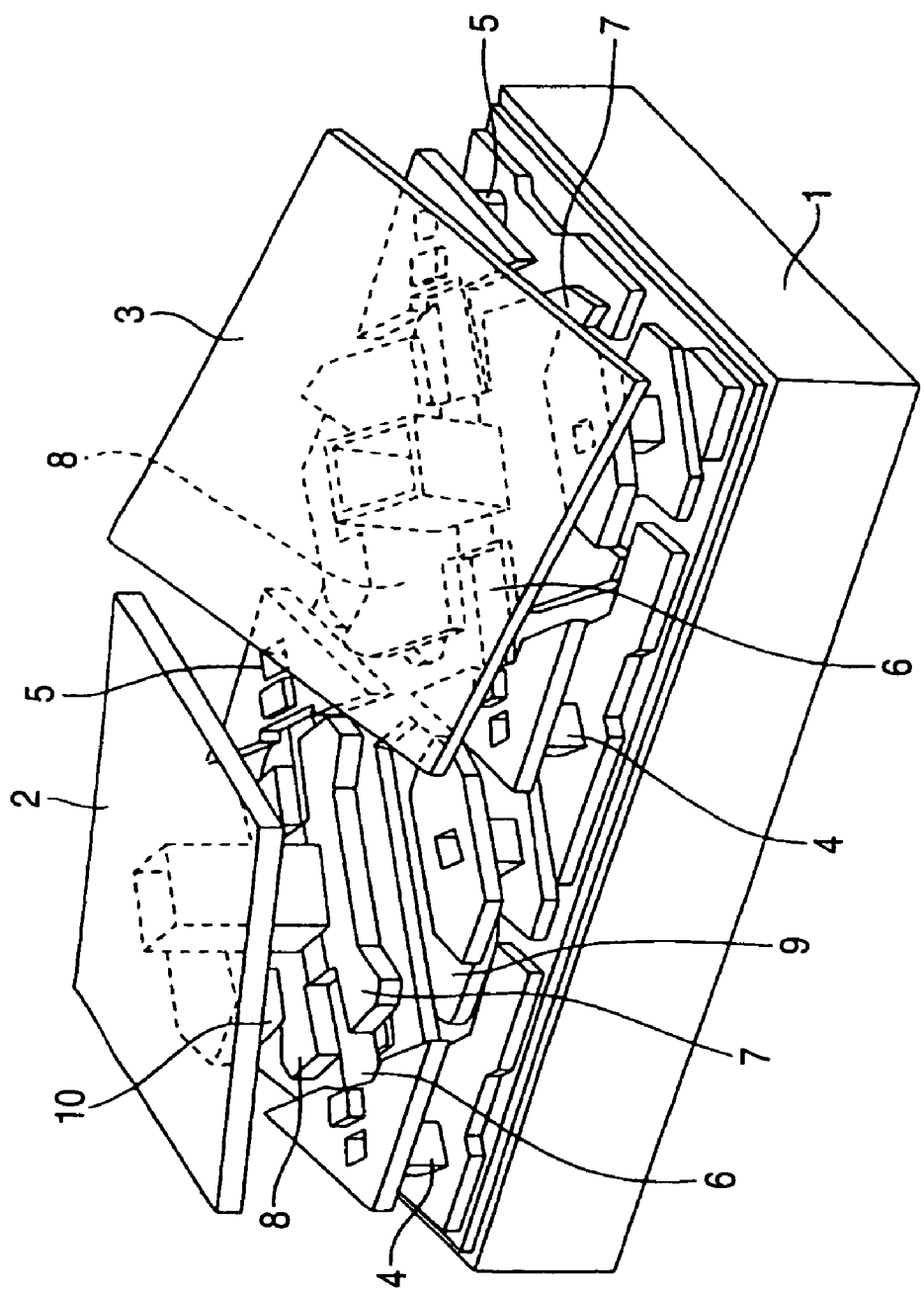
FIG. 9 is a constitution view of two devices showing an example of a microelectromechanical device array.

FIGS. 2 and 3 are explanatory views of a method of driving a drive circuit of a microelectromechanical device array apparatus according to a first exemplary embodiment of the invention. The embodiment includes the same elements as that shown in FIG. 1, and further includes a control section (not illustrated). A method of driving the drive circuit according to the embodiment differs from that of the apparatus of FIG. 9. In the embodiment, a description will be given of an example of applying an address voltage Va to a fixed electrode film (address electrode film) as a device-displacing voltage (i.e, a device-displacing signal) and applying a bias voltage Vb to a movable electrode film as a control voltage.

FIG. 2 shows a transition of changing from a state of inclining the movable mirror 2 to a left to a following state (crossover state (left side) or stay state (right side)). In the state of inclining the movable mirror 2 to the left side, as shown by an upper stage drawing of FIG. 2, the voltage applied to the address electrode film (fixed electrode film) 10 is Va=0 V, the voltage (bias voltage) applied to the electrode films 7, 8 is Vb=24 V, the voltage applied to the address electrode film 9 is Va=5 V, an absolute value of the voltage difference DV between the electrode films 8, 10 is 24 V, and an absolute value of the voltage difference DV between the electrode films 7, 9 is 19 V. Under the state, the electrostatic force between the electrode films 8, 10 exceeds the electrostatic force between the electrode films 7, 9, further, the gap between the electrode films 8, 10 is narrow and therefore, the electrostatic force is further intensified.

FIG. 3 is a graph showing a change (upper stage) in the voltage difference DV between the electrode films 8, 10 on the left side of the movable mirror 2 and an angle of displacing the movable mirror (lower stage). According to the embodiment, in a case of transiting to the following state, the address is applied (or rewritten) by controlling the voltage Va (device-displacing signals) applied to the address electrode films 9, 10 similar to that explained in zone A of FIG. 10. That is, applied voltage Va of the fixed electrode film on a side of intending to fall down the movable mirror is set to 0 V and the applied voltage Va of the electrode film on the opposed side is set to 5 V.

Thereby, according to the movable mirror 2 on the crossover side (left side of FIG. 2), the absolute value of the voltage difference DV between the electrode films 8, 10 becomes 19 V and the absolute value of the voltage difference DV between the electrode films 7, 9 becomes 24 V. Although the voltage difference DV between the electrode films 7, 9 is larger, the movable mirror 2 is brought into a state of being inclined to the left side, that is, a distance between the electrode films 8, 10 is narrowed and therefore, the electrostatic force between the electrode films 8, 10 is stronger than the electrostatic force between the electrode films 7, 9.

Next, according to the embodiment, the state is transited to state II. That is, the bias voltage Vb is simply reduced. In the illustrated example, the bias voltage Vb is reduced from 24 V to 19 V.

Thereby, according to the movable mirror 2 on the crossover side (left side of FIG. 2), the absolute voltage of the voltage difference DV between the electrode films 8,10 is changed to 14 V by exceeding a pull out voltage, mentioned later, the absolute value of the voltage difference DV between the electrode films 7, 9 is changed from 24 V to 19 V, the electrostatic force becomes stronger between the electrode films 7, 9 than between the electrode films 8, 10. As a result, the movable mirror 2 is rotated in the clockwise direction to be brought to a state of being inclined to the right side.

According to the movable mirror 2 on the stay side (right side of FIG. 2), in state I, the absolute value of the voltage difference DV between the electrode films 8, 10 is 24 V, the absolute value of the voltage difference DV between the electrode films 7, 9 is 19 V, when the bias voltage Vb is reduced to 19 V by transiting to the state II, the absolute value of the voltage difference DV between the electrode films 8, 10 becomes 19 V, however, also the absolute value of the voltage difference DV between the electrode films 7, 9 is reduced to 14 V from state I to state II, always, the electrostatic force between the electrode films 8,10 exceeds the electrostatic force between the electrode films 7, 9. That is, the movable mirror 2 on the stay side stays to be unmoved while being inclined and the electrode film 8 is not detached from the fixed electrode film 10.

Figure 4:
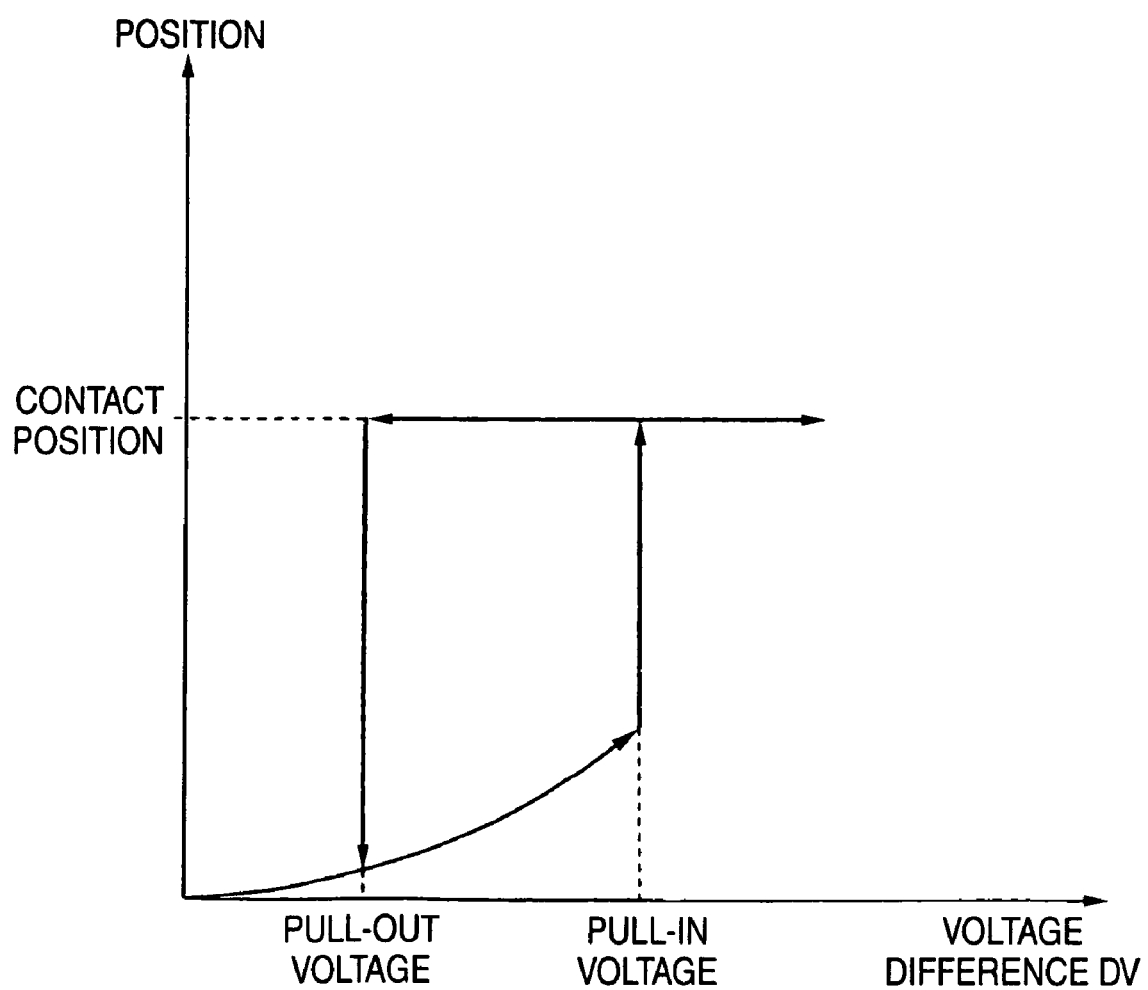
FIG. 4 is a graph for explaining a pull out voltage shown in FIG. 3.

FIG. 4 is an explanatory view of the pull out voltage. The movable electrode film 8 is elastically supported by the hinge 6 and when the voltage difference DV is applied between the two electrode films 8, 10, the movable electrode film 8 is gradually inclined to the fixed electrode film 10 against an elastic force of the hinge 6 per se. Further, when a certain voltage difference is applied, the movable electrode film 8 is abruptly brought into contact with the fixed electrode film 10. A voltage providing the voltage difference is referred to as a pull in voltage.

Even when the voltage applied to the movable electrode film 8 temporarily brought into contact with the fixed electrode film 10 is reduced to be equal to or lower than the pull in voltage, the movable voltage film 8 is not immediately detached from the fixed electrode film 10, because the gap between the electrode films 8, 10 is narrowed. When the voltage applied to the movable electrode film 8 is further reduced to reach a certain voltage, the movable electrode film

8 is abruptly detached from the fixed electrode film 10. A voltage at this occasion is referred to as a pull out voltage.

That is, according to the embodiment, the bias voltage is reduced under the state II, when the bias voltage is reduced, the movable mirror on the crossover side is controlled such that the voltage difference between the electrode films 8, 10 is changed by crossing over the pull out voltage and the movable mirror on the stay side is controlled such that the voltage difference between the electrode films 8, 10 does not cross over the pull out voltage. Thereby, the movable mirror on the stay side stays to be unmoved and only the movable mirror on the crossover side is moved to the opposed side.

As described above, according to the embodiment, the movable mirror on the crossover side and the movable mirror on the stay side can be controlled to be separated from each other easily and firmly and control accuracy of the array control is promoted. Further, the ranges of changing the bias voltage Vb and the address voltage Va can be narrowed and therefore, the load of the drive circuit can be alleviated.

Second Embodiment

Figure 5:
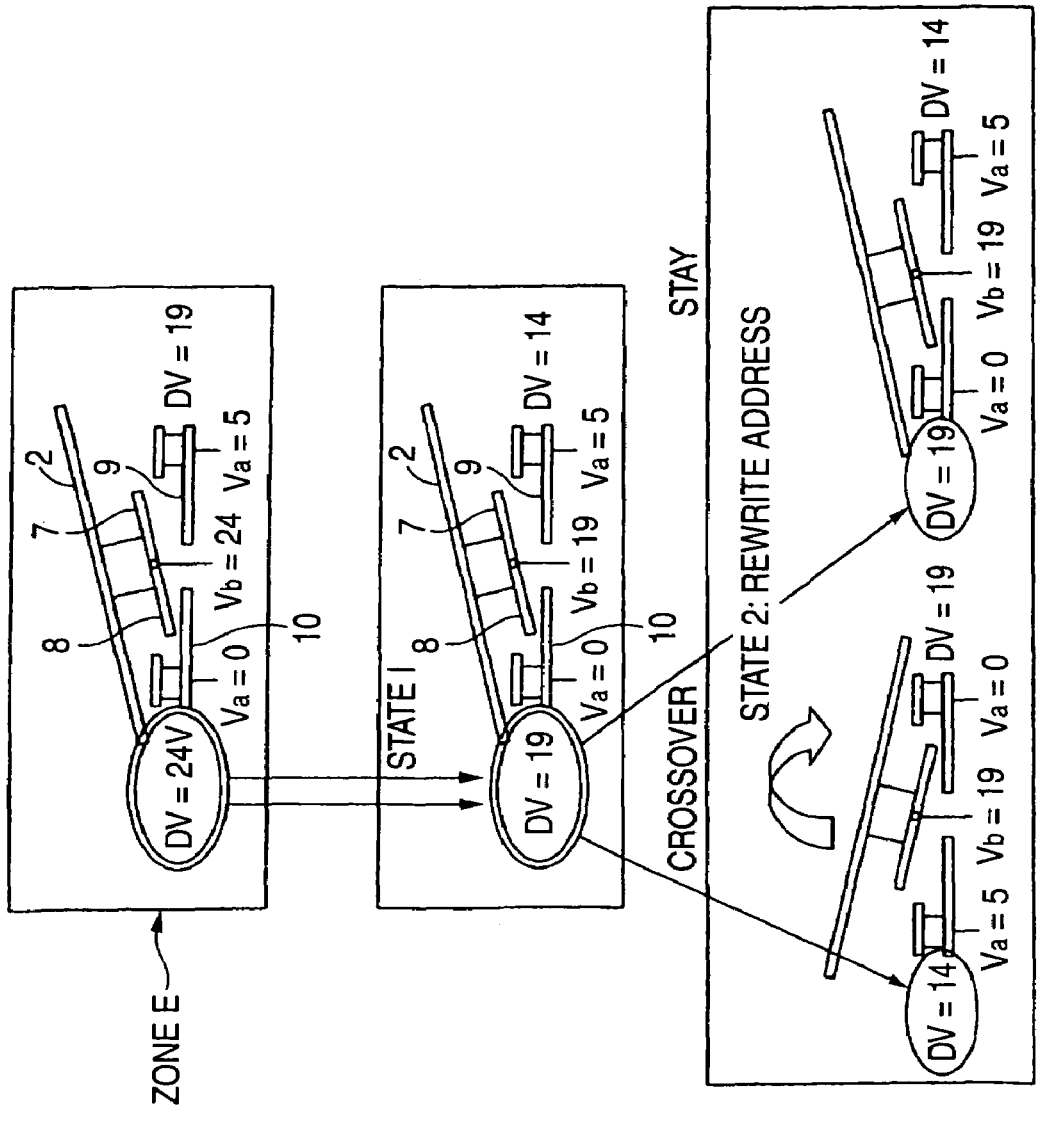
FIG. 5 is an explanatory view of a method of driving a microelectromechanical device array apparatus according to a second exemplary embodiment of the invention.
Figure 6:
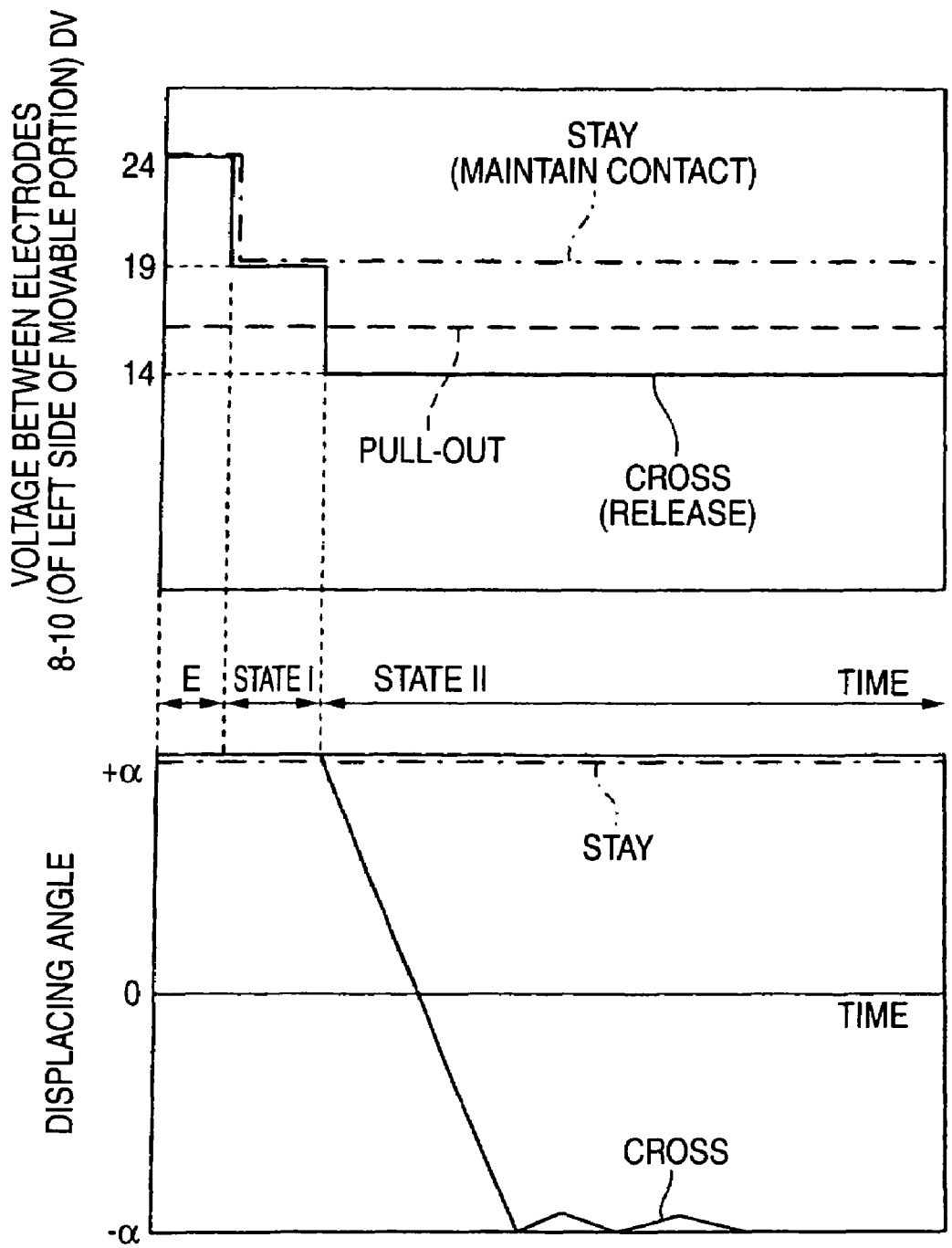
FIG. 6 is a graph showing a voltage between electrodes and an angle of displacing a movable mirror of the driving method shown in FIG. 5.

FIGS. 5 and 6 are explanatory views of a method of driving a drive circuit of a microelectromechanical device array apparatus according to a second exemplary embodiment of the invention. Also in the embodiment, the embodiment includes the same elements as that shown in FIG. 1, and further includes a control section (not illustrated). A method of driving the drive circuit according to the embodiment differs from that of the apparatus of FIG. 9.

According to the embodiment, contrary to the first embodiment, in state I, first, the bias voltage is reduced from Vb=24 V to Vb=19 V. Further, in next state II, the address voltage Va is applied (or rewritten).

That is, according to the embodiment, in state I, the absolute value of the voltage difference DV between the electrode films 8, 10 becomes 19 V, the absolute value of the voltage difference DV between the electrode films 7, 9 becomes 14 V, and both of the movable mirror on the crossover side and the movable mirror on the stay side are maintained in the state of being inclined to the left side.

At next state II, when the address Va is rewritten, according to the movable mirror on the crossover side, the absolute value of the voltage difference DV between the electrode films 8, 10 becomes 14 V, the absolute value of the voltage difference DV between the electrode films 7, 9 becomes 19 V, and the movable mirror 2 is rotated in the clockwise direction to be inclined to the right side by making the electrostatic force between the electrode films 7, 9 superior thereto.

On the other hand, according to the movable mirror 2 on the stay side, the absolute value of the voltage difference DV between the electrode films 8, 10 becomes 19 V, the absolute value of the voltage difference DV between the electrode films 7, 9 becomes 14 V, the state in which the electrostatic force between the electrode films 8, 10 is superior to the electrostatic force between the electrode films 7, 9 is maintained and the state of being inclined to the left side is maintained.

Also according to the embodiment, similar to the first embodiment, the movable mirror on the crossover side and the movable mirror on the stay side can be controlled to be separated from each other easily and firmly and the control accuracy of the array control is promoted. Further, ranges of changing the bias voltage Vb and the address voltage Va can be narrowed and therefore, the load of the drive circuit is alleviated.

Third Embodiment

Figure 7:
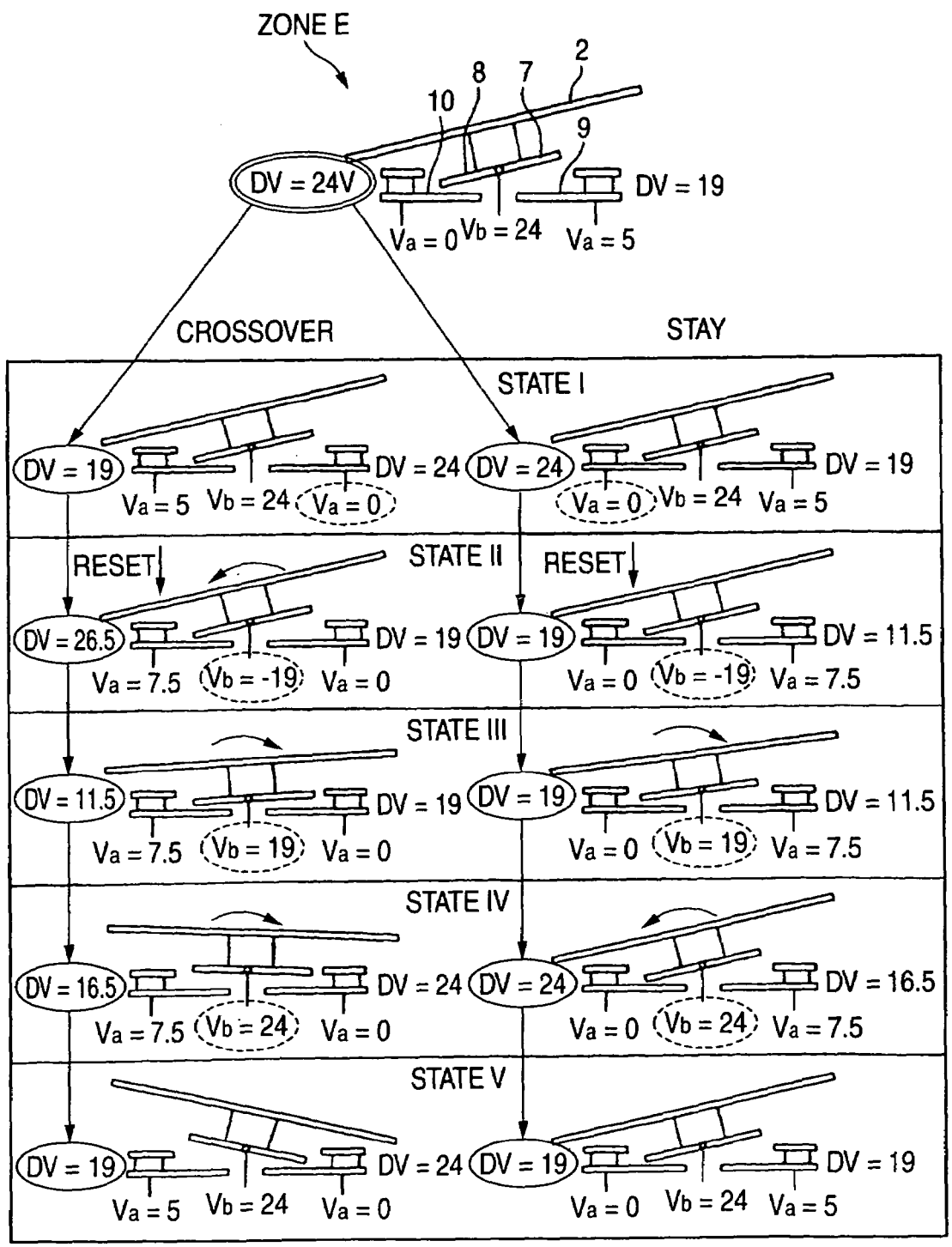
FIG. 7 is an explanatory view of a method of driving a microelectromechanical device array apparatus according to a third exemplary embodiment of the invention.
Figure 8:
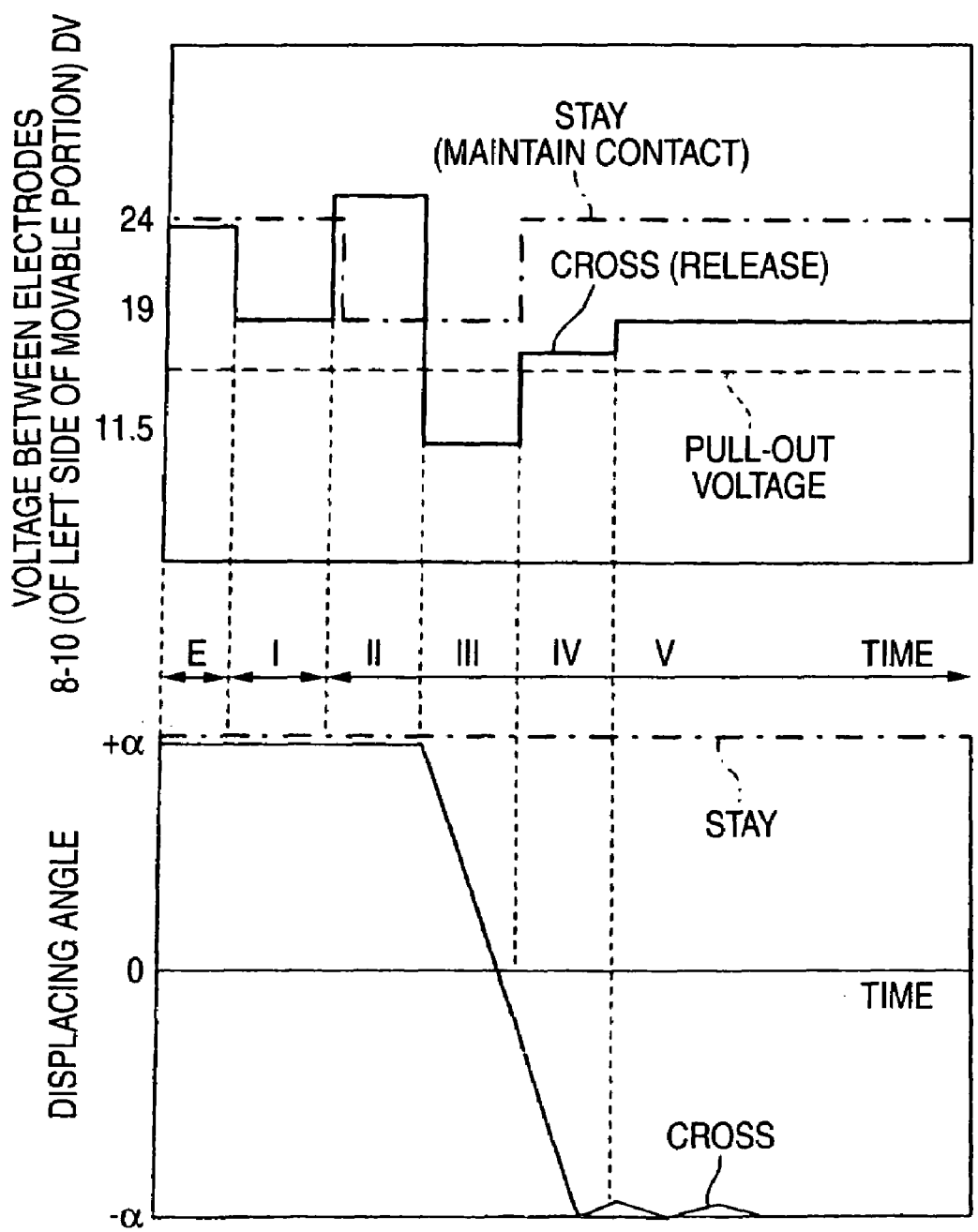
FIG. 8 is a graph showing a voltage between electrodes of an angle of displacing a movable mirror of the driving method shown in FIG. 7.

FIGS. 7 and 8 are explanatory views of a method of driving a drive circuit of a microelectromechanical device array apparatus according to a third exemplary embodiment of the invention. The embodiment includes the same elements as that shown in FIG. 1, and further includes a control section and/or deforming section, which are not illustrated. A method of driving the drive circuit according to the embodiment differs from that of the apparatus of FIG. 9.

Figure 10:
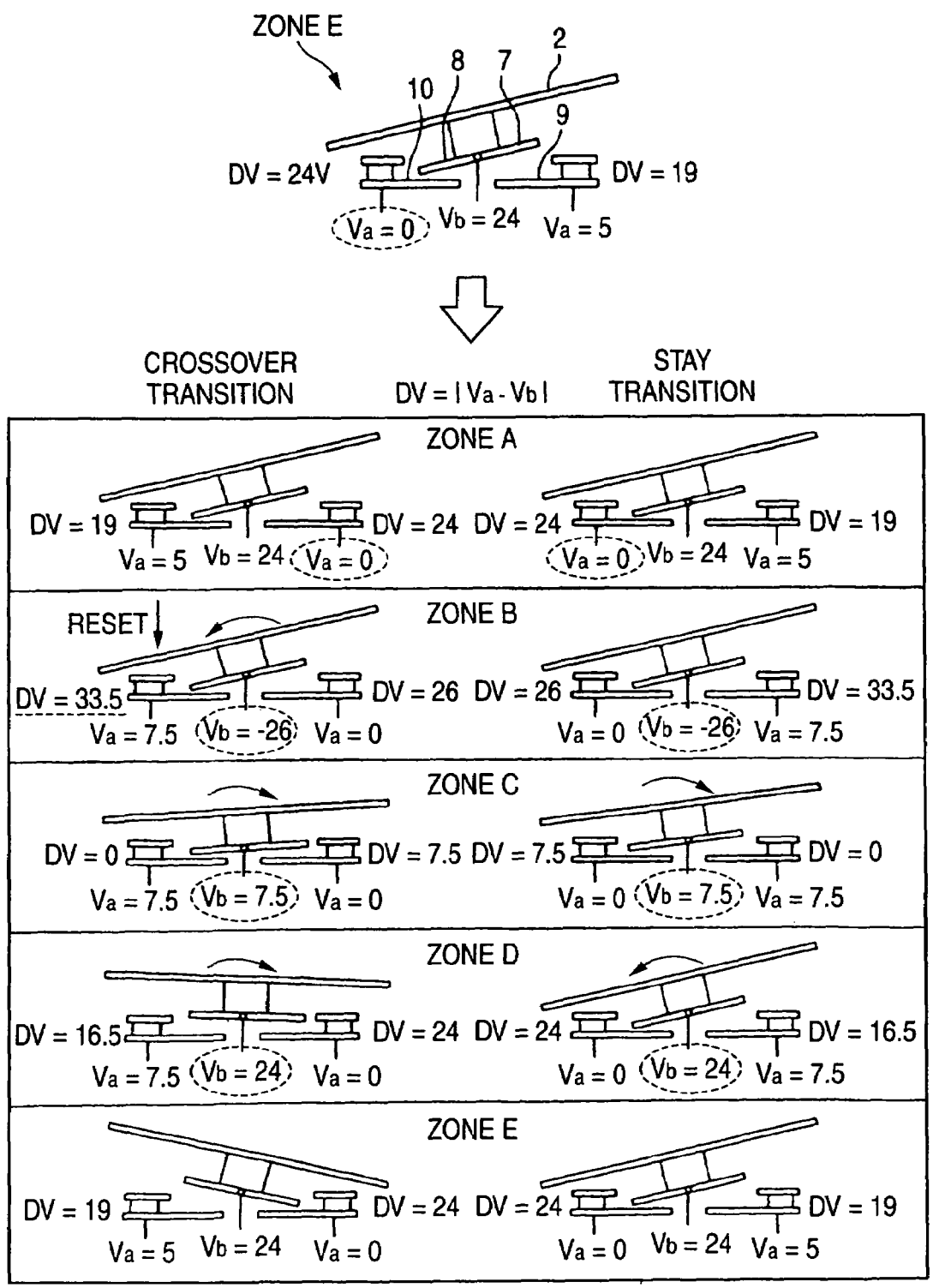
FIG. 10 is an explanatory view of a method of driving a microelectromechanical device array apparatus of a background art.
Figure 11:
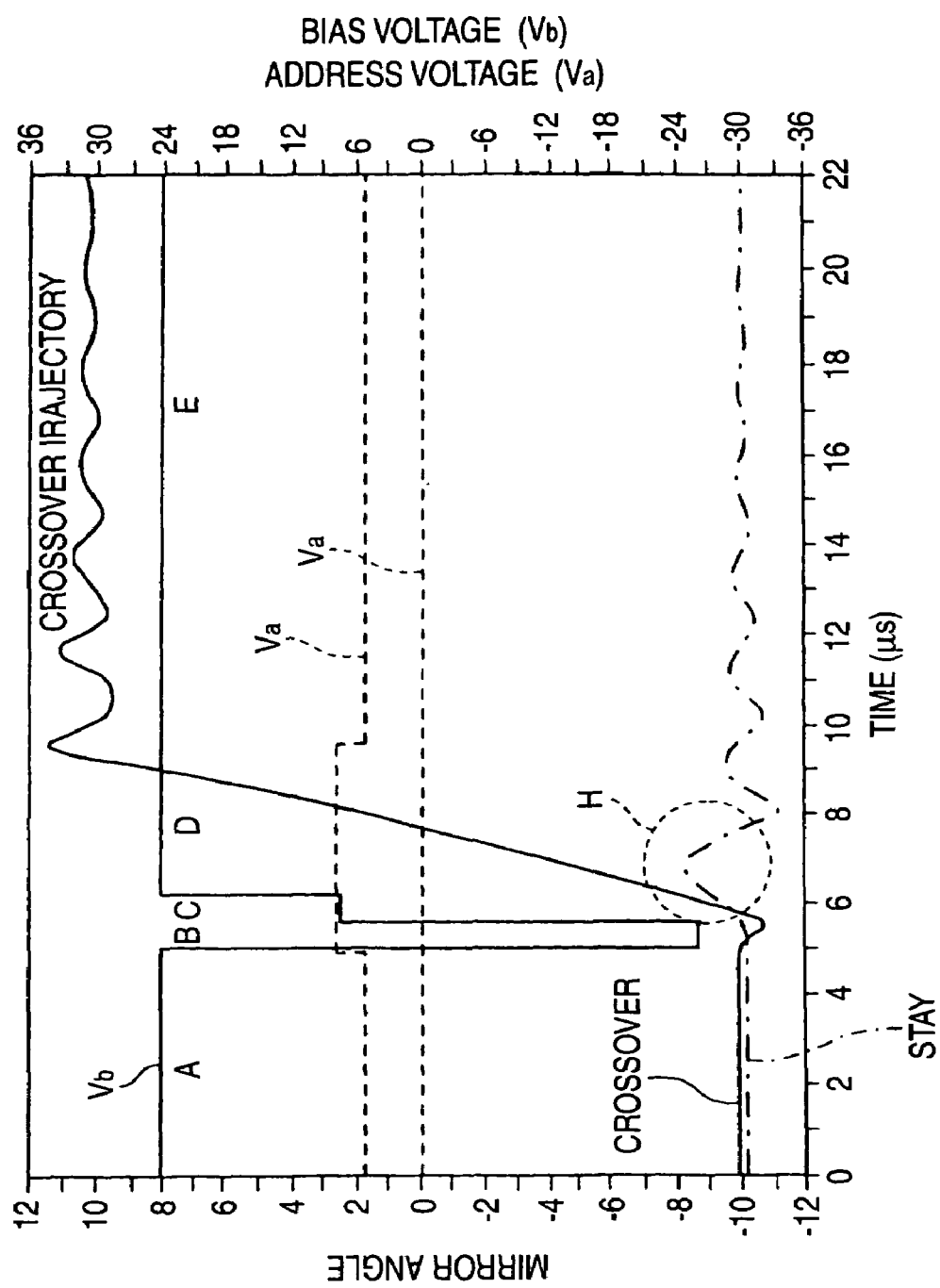
FIG. 11 is a graph showing changes in an address voltage Va, a bias voltage Vb, and an angle of displacing a movable mirror in the driving method shown in FIG. 10.

Although according to the first and second embodiments there is not adopted a method of further pressing the movable mirror to the inclined side and detaching the inclined side movable electrode film of the fixed electrode film by utilizing the repulsive force of the elastically deformed movable electrode 8 as explained in zone B of FIG. 10. However, when an adsorbing force between the electrode films is excessively intensified by stain or the like adhered to the electrode films or the like, it is necessary to detach the movable electrode film from the fixed electrode film by utilizing the repulsive force.

The embodiment is an embodiment of applying the invention to an example of pressing the movable mirror to the inclined side and inclining the movable mirror on the crossover side to the opposed side by utilizing the repulsive force by elastically deforming the movable electrode film.

States I, II, III, IV, V shown in FIG. 7 respectively correspond to zones A, B, C, D, E of FIG. 10, first, in state I, the bias voltage is set to Vb=+24 V and in state II, the bias voltage is set to Vb=−19 V. In next state III, the bias voltage is set to Vb=+19 V, in state IV, the bias voltage is returned to Vb=24 V, and in state V, the bias voltage is maintained at Vb=24 V.

That is, according to the embodiment, although the bias voltage Vb is reduced from +24 V to +19 V similar to the first, the second embodiments, before reducing the bias voltage to +19 V, state II for setting the bias voltage to an inverse polarity voltage (−19 V) is inserted between state I and state III.

In state I, the address voltage Va (0 V or 5 V) as an device-displacing signal is rewritten. Next, when the bias voltage Vb in state II becomes −19 V, the voltage difference becomes DV=26.5 V between the electrode films 8, 10 and the voltage difference becomes DV=19 V between the electrode films 7, 9. Thereby, the movable mirror 2 is applied with the electrostatic force for further inclining the movable mirror 2 to a left side, the movable control film 8 is pressed to the fixed electrode film 10 to be elastically deformed.

In next state III, when the bias voltage becomes Vb=19 V, the voltage applied to the address electrode film 10 is set to Va=7.5 V. Thereby, the movable electrode film 8 is detached from the fixed electrode film 10 by adding the repulsive force by elastically deforming the electrode film 8 to the electrostatic force and the movable mirror 2 starts rotating in the clockwise direction.

In next state IV, when the bias voltage becomes Vb=24 V, the voltage difference between the electrode films 8, 10 becomes DV=16.5 V, the voltage difference between the electrode films 7, 9 becomes DV=24, the electrostatic force operated between the electrode films 7, 9 is further intensified and the movable mirror 2 is rotated further in the clockwise direction.

In final state V, the movable electrode film 7 of the movable mirror 2 is impacted to the address electrode film (fixed electrode film) 9, at this occasion, the voltage applied to the address electrode film 10 is set to Va=5 V. The movable mirror 2 is slightly vibrated by impact to be brought into a stable state to finish the inclining operation to the opposed side is finished.

In order to bring the mirror 2 to a state on a right side (stay side) of FIG. 7, as shown by an upper stage on a right side in a frame of FIG. 7, the voltage applied to the address electrode film 10 of the electrode film 10 is set to Va=0 (state I). In next state II, when the bias voltage becomes Vb=−19 V, the applied voltage of the address electrode film 9 on the opposed side is set to DV=7.5 V, in next state III, the bias voltage is set to VB=19 V.

Although in FIG. 10 of the background art, the movable electrode film is temporarily detached from the fixed electrode film 10, according to the embodiment, the voltage difference DV between the electrode films 7, 9 does not become excessively larger than the voltage difference DV between the electrode films 8, 10 and therefore, in state III, the movable electrode film 8 is not detached from the fixed electrode film 10.

At next state IV, even when the bias voltage becomes Vb=24 V, the state of inclining the movable mirror 2 (state of inclining to the left side) is maintained, thereafter, even when the applied voltage of the electrode film 9 becomes Va=5 V in state V, the state of inclining the movable mirror 2 to the left side is maintained.

Although according to the embodiment, the movable mirror on the crossover side is detached from the fixed electrode film by utilizing the repulsive force of the elastic deformation, the movable mirror on the crossover side is displaced while maintaining the inclined state of the movable mirror on the stay side and therefore, control accuracy of the array control is promoted, a voltage value for converting the bias voltage Vb in state II into a reverse polarity can be reduced and therefore, also the load of the drive circuit is alleviated.

Further, although according to the above-described respective embodiments the same bias voltage Vb is applied to the movable electrode films 7, 8 provided on the side of the movable mirror and the address voltages Va constituting the device-displacing signals applied to the respectives of the fixed electrode films 9, 10, conversely, there may be constructed a constitution in which the address voltages are applied to the movable electrode films 7, 8 and the common bias voltage is applied to the fixed electrode films 9, 10.

The above-described microelectromechanical device array apparatus can be utilized as an image forming apparatus of an optical printer, an image projecting apparatus or the like. In this case, the image forming apparatus is constituted by including a light source, the microelectromechanical device array apparatus described in any of the above-described embodiments, an optical system for irradiating light from the light source to the microelectromechanical device array apparatus, and a projecting optical system for projecting light emitted from the optical system to an image forming face.

According to the microelectromechanical device array apparatus according to an exemplary embodiment of the invention, the circuit load is alleviated, the ON/OFF control of the respective devices can easily and firmly be carried out and therefore, the apparatus is useful as the microelectromechanical device array apparatus having high reliability.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-176578 filed Jun. 16 of 2005, the contents of which are incorporated herein by reference.

What is claimed is:

1. A microelectromechanical device array apparatus comprising:
    a device array comprising a plurality of devices one-dimensionally or two-dimensionally arranged, each of the plurality of devices comprising:
    a movable portion elastically deformably supported; and comprising
    a movable electrode; and
    a plurality of fixed electrodes facing to the movable portion,
    a plurality of drive circuits corresponding to the plurality of devices, each of the drive circuits applying a device-displacing voltage to one of the movable electrode and the plurality of fixed electrodes and applying a control voltage to the other of the movable electrode and the plurality of fixed electrodes so that an electrostatic force between the movable electrode and each of the plurality of fixed electrodes is generated to displace the movable portion toward one of at least two positions including a first position and a second position different from the first position, and
    a control section that controls a displacement of the movable position in each of the plurality of the devices,
    wherein:
    the plurality of devices includes: a first device in a first state to be controlled to displace a position of the movable portion from one of the first and second positions to the other of the first and second positions; and a second device in a second state to be controlled to maintain a position of the movable portion at one of the first and second positions,
    the control section controls simultaneously the first and second devices so that the position of the movable portion in the first device is displaced while the position of the movable portion in the second device is unmovably maintained,
    the control section reduces an absolute value of the control voltage applied to the first device so that a voltage between the movable electrode and one of the plurality of fixed electrodes provided on a side of moving the movable portion into a voltage having a magnitude upon which the movable portion can be displaced, and
    the control section reduces an absolute value of the control voltage applied to the second device so that a voltage between the movable electrode and one of the plurality of fixed electrodes provided on a side of moving the movable portion into a voltage having a magnitude upon which the movable portion can not be displaced.

2. The microelectromechanical device array apparatus according to claim 1, wherein
    the control section applies a device-displacing voltage to the first device so that a voltage between the movable electrode and one of the plurality of fixed electrodes provided on a side of moving the movable portion into a voltage having a magnitude upon which the movable portion can be displaced, and
    the control section applies a device-displacing voltage to the second device so that a voltage between the movable electrode and one of the plurality of fixed electrodes provided on a side of moving the movable portion into a voltage having a magnitude upon which the movable portion can not be displaced.

3. The microelectromechanical device array apparatus according to claim 1, wherein each of the plurality of drive circuits comprises a deforming section that elastically deforms at least a portion of the movable portion in the first device at a current position before reducing the absolute value of the control voltage, so as to accelerate the displacement of the movable position by a repulsive force upon the elastically deforming.

4. The microelectromechanical device array apparatus according to claim 3, wherein the deforming section converts the control voltage into an inverse polarity.

5. The microelectromechanical device array apparatus according to claim 1, wherein the absolute value of the control voltage is reduced after applying the device-displacing voltage to one of the movable electrode and the plurality of fixed electrodes.

6. The microelectromechanical device array apparatus according to claim 1, wherein after reducing the absolute value of the control voltage applied to one of the movable electrode and the fixed electrodes, the device-displacing voltage is applied to the other of the movable electrode and the plurality of fixed electrodes.

7. The microelectromechanical device array apparatus according to claim 1, wherein
the control section reduces or increases the device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced, and
the control section reduces or increases the device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

8. The microelectromechanical device array apparatus according to claim 1, wherein the control section provides each of the plurality of drive circuits with an instruction signal in relation to the device-displacing voltage and the control voltage so as to make the device array an optical modulation.

9. A method of driving a microelectromechanical device array apparatus,
the microelectromechanical device array apparatus comprising:
a device array comprising a plurality of devices one-dimensionally or two-dimensionally arranged, each of the plurality of devices comprising:
a movable portion elastically deformably supported and comprising
a movable electrode; and
a plurality of fixed electrodes facing to the movable portion, and
a plurality of drive circuits corresponding to the plurality of devices, each of the drive circuits applying a device-displacing voltage to one of the movable electrode and the plurality of fixed electrodes and applying a control voltage to the other of the movable electrode and the plurality of fixed electrodes so that an electrostatic force between the movable electrode and each of the plurality of fixed electrodes is generated to displace the movable portion toward one of at least two positions including a first position and a second position different from the first position,
wherein
the plurality of devices includes: a first device in a first state to be controlled to displace a position of the movable portion from one of the first and second positions to the other of the first and second positions; and a second device in a second state to be controlled to maintain a position of the movable portion at one of the first and second positions,
the method comprising controlling simultaneously the first and second devices so that the position of the movable portion in the first device is displaced while the position of the movable portion in the second device is unmovably maintained,
reducing an absolute value of the control voltage applied to the first device so that a voltage between the movable electrode and one of the plurality of fixed electrodes provided on a side of moving the movable portion into a voltage having a magnitude upon which the movable portion can be displaced, and
reducing an absolute value of the control voltage applied to the second device so that a voltage between the movable electrode and one of the plurality of fixed electrodes provided on a side of moving the movable portion into a voltage having a magnitude upon which the movable portion can not be displaced.

10. The method of driving a microelectromechanical device array apparatus according to claim 9, which comprises:
applying a device-displacing voltage to the first device so that a voltage between the movable electrode and one of the plurality of fixed electrodes provided on a side of moving the movable portion into a voltage having a magnitude upon which the movable portion can be displaced, and
applying a device-displacing voltage to the second device so that a voltage between the movable electrode and one of the plurality of fixed electrodes provided on a side of moving the movable portion into a voltage having a magnitude upon which the movable portion can not be displaced.

11. The method of driving a microelectromechanical device array apparatus according to claim 9, which comprises elastically deforming at least a portion of the movable portion in the first device at a current position before the reducing of the absolute value of the control voltage, so as to accelerate the displacement of the movable position by a repulsive force upon the elastically deforming.

12. The method of driving a microelectromechanical device array apparatus according to claim 11, wherein the elastically deforming is performed by converting the control voltage into an inverse polarity.

13. The method of driving a microelectromechanical device array apparatus according to claim 9, wherein the reducing of the absolute value of the control voltage is performed after applying the device-displacing voltage to one of the movable electrode and the plurality of fixed electrodes.

14. The method of driving a microelectromechanical device array apparatus according to claim 9, which comprises applying a device-displacing voltage to one of the movable electrode and the plurality of fixed electrodes after the reducing of the absolute value of the control voltage applied to the other of the movable electrode and the fixed electrodes.

15. The method of driving a microelectromechanical device array apparatus according to claim 9, which comprises:
reducing or increasing a device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced, and reducing or increasing a device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

16. The method of driving a microelectromechanical device array apparatus according to claim 9, which comprising providing each of the plurality of drive circuits with an instruction signal in relation to the device-displacing voltage and the control voltage so as to make the device array an optical modulation.

17. An image forming apparatus comprising:
a light source,
a microelectromechanical device array apparatus according to claim 1,
an optical system for irradiating the microelectromechanical device array apparatus with light from the light source; and
a projecting optical system that projects light emitted from the optical system to an image forming surface.

18. The microelectromechanical device array apparatus according to claim 1, further comprising a plurality of cells each comprising a first device in a first state to be controlled to displace a position of the moveable portion from one of the first and second positions to the other first and second positions and a second device in a second state to be controlled to maintain a positions of the moveable portion at one of the first and second positions.

19. The microelectromechanical device array apparatus according to claim 1, wherein the control section reduces or increases the device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced.

20. The microelectromechanical device array apparatus according to claim 1, wherein the control section reduces or increases the device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

21. The method of driving a microelectromechanical device array apparatus according to claim 9, which comprises:
reducing or increasing a device-displacing voltage applied to the first device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can be displaced.

22. The method of driving a microelectromechanical device array apparatus according to claim 9, which comprises:
reducing or increasing a device-displacing voltage applied to the second device to reduce an absolute value of a voltage difference between the device-displacing voltage and the control voltage so that a voltage between the movable electrode and one of the plurality of fixed electrodes provided on a side of moving the movable portion into a voltage having a magnitude upon which the movable portion can not be displaced.

* * * * *